UNITED STATES PATENT OFFICE.

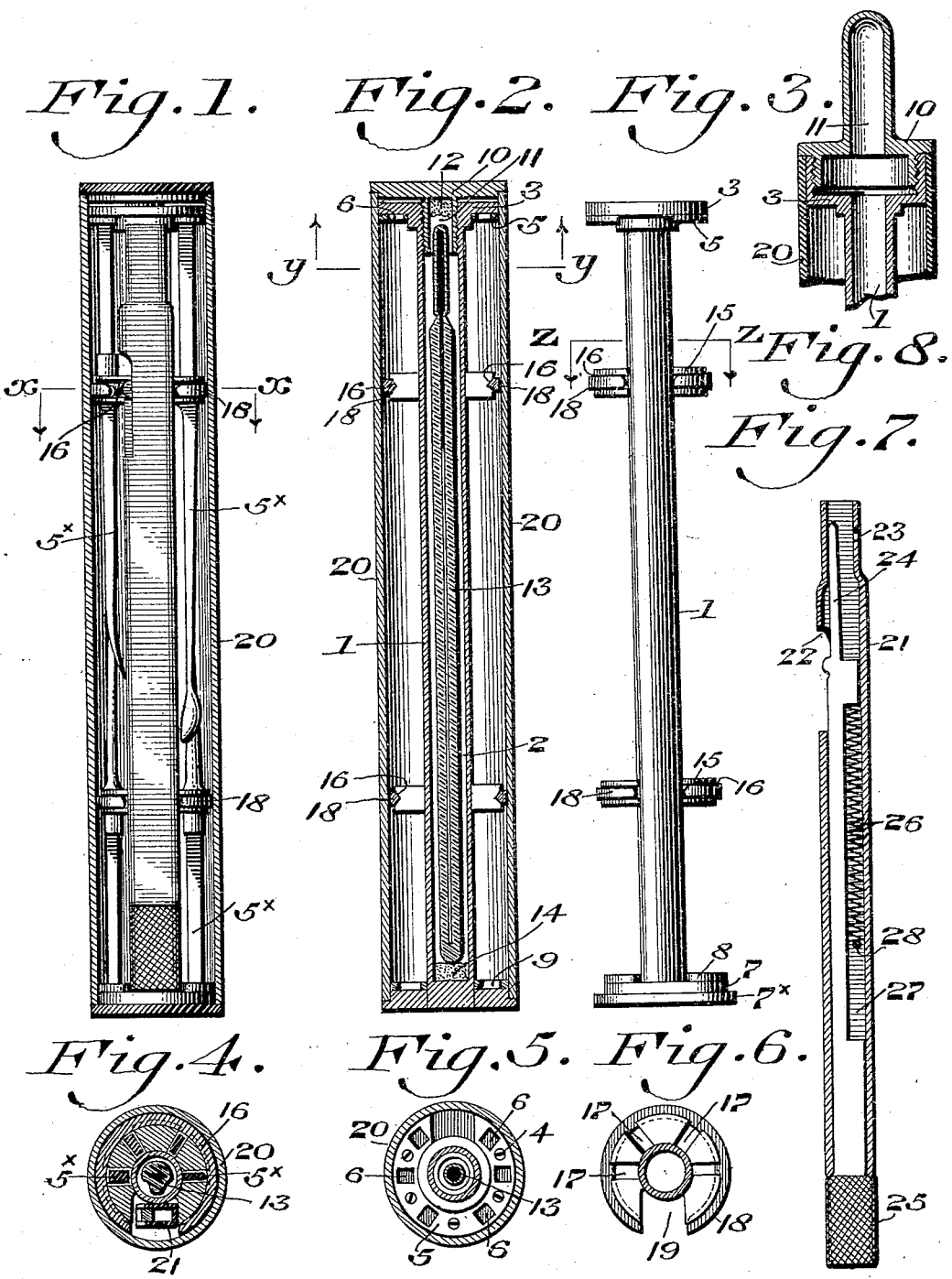

MAX PAUL HERMANN, OF PHILADELPHIA, PENNSYLVANIA.

THERMOMETER-CASE AND INSTRUMENT-HOLDER.

943,676.

Specification of Letters Patent. Patented Dec. 21, 1909.

Application filed August 22, 1908. Serial No. 449,851.

*To all whom it may concern:*

Be it known that I, MAX PAUL HERMANN, a citizen of the United States, residing in the city and county of Philadelphia, State of Pennsylvania, have invented a new and useful Thermometer-Case and Instrument-Holder, of which the following is a specification.

This invention relates to an instrument holder and case for a thermometer and has for an object to provide a holder small and compact in size and one wherein a number of instruments may be readily carried and at the same time the entire device is capable of being carried in a pocket.

It further consists of a novel tool handle adapted to receive and securely hold separately therein a large number of various types of instruments, the same being of such dimensions that it, along with all of the instruments, may readily be carried within the aforesaid instrument holder.

It further consists of other novel features of construction, all as will be hereinafter fully set forth.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents an instrument holder embodying my invention, the case being shown in section. Fig. 2 represents a sectional elevation of the same. Fig. 3 represents a detail of the instrument support. Fig. 4 represents a section on line $x$—$x$, Fig. 1. Fig. 5 represents a section on line $y$—$y$, Fig. 2. Fig. 6 represents a section on line $z$—$z$, Fig. 3. Fig. 7 represents a sectional elevation of a combination handle for the instruments. Fig. 8 represents a section showing a modified form of cap.

Similar numerals of reference indicate corresponding parts in the figures.

Referring to the drawings:—1 designates a bar, preferably cylindrical in shape, for a number of surgical instruments and is provided with a bore 2 therein for a purpose to be presently described. One end of the bar 1 is provided with a collar 3 having secured thereto in any suitable manner, as by set screws 4, the disk member 5 provided at suitable spaced intervals with apertures 6 adapted to receive the ends of the several instruments $5^\times$ and hold the same against displacement. The opposite end of the bar 1 is likewise provided with a collar 7 having a similar disk member 8 secured thereto in which are like apertures 9 for the purpose of securing the ends of another set of instruments against displacement. It will be noted that the collar 7 has a circumferential flange $7^\times$, for a purpose to be presently described.

10 designates a cap adapted to screw into the open end of the bar 1, the said cap having a bore 11 therein to receive a suitable cushioning means 12, since the bore 2 is adapted to receive a small pocket thermometer 13. It will, of course, be understood that a like cushioning means 14 is provided at the closed end of the bar 1 for the thermometer 13 to rest on, thereby protecting both ends of the same from any jars tending to fracture the glass. At suitable points on the bar 1 and preferably integral therewith, are located a plurality of disk flanges 15. Each of these flanges is provided with an annular circumferential groove 16 and a plurality of radial apertures 17, each of the latter serving to receive the shank of an instrument, while the former each hold a split ring 18, which acts as a retaining means for locking the instruments in place on the apertured flange 15.

It will be noted that the opening 19 in the ring 18 is of sufficient width to completely open the largest of the radial openings 17 and at the same time when it is rotated about the flange it will not, in any position, allow two of the openings to be unlocked at the same time, while of course it will be seen that it may readily be adjusted so as to close all of the openings and thereby retain the instruments $5^\times$ in place.

When the instruments $5^\times$ have all been secured in place by rotating the respective locking rings a sufficient distance a tube casing 20 is slipped over the collar 3 until it contacts with the flange $7^\times$ of the opposite collar, thereby inclosing the bar 1 and the instruments carried by it. In order to completely secure the bar 1 in the casing 20 the cap 10 is screwed into place and being of greater diameter than the casing 20, the latter and the adjacent parts are firmly united.

A combination handle is adapted to receive and lock in position one of a number of instruments commonly used in surgical operations and consists of a tubular member 21 provided with an opening 22 therein adapted to receive the shank of an instrument $5^x$, while 23 designates an auxiliary aperture designed to coöperate with a projection on the shank of the said instrument, whereby the latter is securely locked within the handle.

24 designates a locking member detachably secured within the casing 21, a knurled end 25 being provided to operate the locking member 24 and a spring 26 located in a recess 27 of the said locking member 24 serves to maintain the parts in normal locked position. A pin 28 or like means is secured to the casing 21, serving as a bearing for one end of the spring.

The operation of this handle will be clear, for when it is desired to insert an instrument and lock the same therein, it is only necessary to grasp the head 25 and withdraw the locking member 24 against the tension of the spring of the casing 21. When the instrument is correctly positioned within the opening 22 with its projection passing through the aperture 23, the locking member 24 is allowed to spring back into place and hold the instrument as firmly as though it were an integral part of the handle itself.

It will be apparent that I have devised a novel pocket holder for surgical instruments which securely locks them against displacement and which at the same time allows ready access to them all and the removal of any desired implement. It further serves as a case for a thermometer, which is preferably arranged entirely independent of the instrument supporting mechanism and is effectually guarded from jars or the like, which might break it.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character described, a bar, a disk member thereon having an opening therein, a flange adjacent said member, a casing inclosing said bar, and a split ring on said flange to close said opening to support an instrument.

2. In a device of the character described, a bar, a disk member thereon having a plurality of openings therein, a flange adjacent said member, a casing inclosing said bar, and a split ring on said flange to close said openings to support a plurality of instruments.

3. In a device of the character described, a bar, a disk member thereon, a flange adjacent said disk member having a plurality of radial openings therein, a casing inclosing said bar, and a split ring on said flange adapted to close said openings to support a plurality of instruments in said openings.

4. In a device of the character described, a bar, a plurality of disk members thereon, a flange adjacent each member having a plurality of radial openings therein, a casing inclosing said bar, and a split ring on said flange to close said openings to support a plurality of instruments in said openings.

5. In a device of the character described, a bar, a plurality of flanges on said bar each provided with a plurality of openings, a split ring on each flange adapted to close said openings to support suitable instruments and a disk adjacent each flange having means to hold one end of each instrument.

6. In a device of the character described, a tubular bar, a plurality of flanges on said bar each provided with a plurality of openings, a split ring on each flange adapted to close said openings to support suitable instruments and a disk adjacent each flange having means to hold one end of each instrument.

MAX PAUL HERMANN.

Witnesses:
C. D. McVay,
J. C. McGlashen.